United States Patent [19]
Matsui et al.

[11] Patent Number: 6,167,514
[45] Date of Patent: Dec. 26, 2000

[54] METHOD, APPARATUS, SYSTEM AND INFORMATION STORAGE MEDIUM FOR WIRELESS COMMUNICATION

[75] Inventors: Tetsuya Matsui; Michio Kobayashi; Masaki Hoshina, all of Suwa, Japan

[73] Assignee: Seiko Epson Corporation, Tokyo, Japan

[21] Appl. No.: 09/029,719

[22] PCT Filed: Jul. 3, 1997

[86] PCT No.: PCT/JP97/02303

§ 371 Date: Mar. 26, 1998

§ 102(e) Date: Mar. 26, 1998

[87] PCT Pub. No.: WO98/01975

PCT Pub. Date: Jan. 15, 1998

[30] Foreign Application Priority Data

Jul. 5, 1996 [JP] Japan .................................. 8-195708

[51] Int. Cl.[7] .................................................. G06N 17/00
[52] U.S. Cl. ..................... 713/150; 713/168; 713/169; 713/170; 380/255; 380/264; 380/270
[58] Field of Search .................................. 380/255, 258, 380/264, 270, 277, 278; 713/168, 169, 170, 171, 150

[56] References Cited

U.S. PATENT DOCUMENTS 5,016,276  5/1991  Matumoto et al. .

FOREIGN PATENT DOCUMENTS

| A1 0 695 059 | 1/1996 | European Pat. Off. . |
| 63-36634 | 2/1988 | Japan . |
| 7-104956 | 4/1995 | Japan . |
| 7-210644 | 8/1995 | Japan . |
| 8-36534 | 2/1996 | Japan . |
| 8-65303 | 3/1996 | Japan . |
| 8-65306 | 3/1996 | Japan . |
| WO 95/19015 | 7/1995 | WIPO . |
| WO 96/04734 | 2/1996 | WIPO . |

OTHER PUBLICATIONS

Menezes et al., "Handbook of Applied Cryptography", 1965, pp. 491, 497, 498.

T. Matsumoto et al., "Key Predistribution System*, Key Sharing without Communication: The Key Predistribution Systems," Transactions of Inst. of Electronics, Inform. and Comm. Engineers A, vol. J71–A, No. 11, 1988, pp. 2046–2053.

S. Miyafuchi, "Does KPS Protect Privacy?", Electronics, Sep. 1995, pp. 51–53.

T. Matsumoto et al., "A Prototype KPS and Its Application–IC Card Based Key Sharing and Cryptographic Communication," Transactions of Institute of Electronics, Inform. and Comm. Engineers, vol. E73, No. 7, 1990, pp. 1111–1119.

T. Matsumoto et al., "Sharing of Encryption Key, Key Sharing System KPS for Large–Scale Networks and Its Realization," Technical Research Report of IEICE, vol. 89, No. 482, (ISEC89–52), 1990, pp. 33–47.

M. Yamai, "Ethernet and TCP/IP," Open Design, vol. 1, No. 3, 1994, pp. 1–32.

*Primary Examiner*—Thomas R. Peeso
*Attorney, Agent, or Firm*—Oliff & Berridge, PLC

[57] ABSTRACT

Wireless communication method and apparatus which can perform the wireless transmission/reception of encrypted data without previous provision of a cryptographic key and without any system for registering a cryptographic key. Under control of a communication control section 504 in PC 1, the PC 1 transmits its own identification information to a printer 2 and receives identification information of the printer 2. The PC 1 has an encrypting/decrypting section 502 which generates a cryptographic key by using the identification information of the printer 2 and its own secret algorithm read out of an identification information storage section 510. According to a cryptographic program using such a cryptographic key, data is encrypted and transmitted toward the printer 2.

23 Claims, 14 Drawing Sheets

METHOD, APPARATUS, SYSTEM AND INFORMATION STORAGE MEDIUM FOR WIRELESS COMMUNICATION

FIELD OF THE INVENTION

The present invention relates to a method, apparatus, system and information storage medium for a wireless communication which are used for performing the wireless transmission/reception of data among a plurality of electronic instruments.

BACKGROUND TECHNOLOGY

In the prior art, there is the probability that data wirelessly transmitted, for example, between two electronic instruments are intercepted.

To avoid this problem, one of the two electronic instruments encrypts data which is in turn transmitted to the other electronic instrument. The other electronic instrument then decrypts the encrypted data.

One of known encrypting/decrypting methods is the common-key type cryptographic system in which the encryption key used to encrypt data to be transmitted is identical with the decryption key used to decrypt the encrypted and transmitted data, this single key for encryption and decryption being kept secret. Generally, the Data Encryption Standard (DES) and the Revest-Shamir-Adleman (RSA) system are used as the known encrypting/decrypting methods. The RSA system is a public key cryptosystem in which an encryption key is publicly opened, but a decryption key is kept secret.

When DES is used to perform data transmission between two electronic instruments, both electronic instruments must know previously about the data transmission.

If a plurality of electronic instruments is used to perform the transmission/reception of data, a number of keys are required. More particularly, 45 keys are required by ten electronic instruments.

On the other hand, RSA requires a system for previously registering the public keys. Such a system causes to increase the installation cost or the like. Further, the data processing by RSA is slow.

SUMMARY OF THE INVENTION

In view of such problems, an object of the present invention is to provide a method, apparatus, system and information storage medium for performing wireless transmission/reception of encrypted data without previous provision of any cryptographic key and without any system for registering a cryptographic key.

According to a first aspect of the invention, there is provided a wireless communication method for wirelessly transmitting and receiving data among a plurality of electronic instruments, each of the electronic instruments having identification information and a secret algorithm, the wireless communication method comprising:

a first step of exchanging identification information between two electronic instruments in the plurality of electronic instruments, before data communication is performed between the two electronic instruments; and a second step of transmitting and receiving data between the two electronic instruments;

wherein the second step includes:

a conversion/transmission step in which one of the two electronic instruments converts data to be transmitted by using a secret algorithm of the one of the two electronic instruments and identification information of the other electronic instrument, and sends the converted data to the other electronic instrument; and a reception/reconversion step in which the other electronic instrument receives and reconverts the converted data by using a secret algorithm of the other electronic instrument and identification information of the one of the two electronic instruments.

The converted data may be encrypted data.

In in the conversion/transmission step, the one of the two electronic instruments may generate a cryptographic key by using a secret algorithm of the one of the two electronic instruments and identification information of the other electronic instrument to encrypt data by a cryptographic program which utilizes the cryptographic key; and in the reception/reconversion step, the other electronic instrument may generate a cryptographic key by using a secret algorithm of the other electronic instrument and identification information of the one of the two electronic instruments to decrypt the encrypted data by a cryptographic program which utilizes the cryptographic key.

According to a second aspect of this invention, there is provided a wireless communication apparatus provided in each of a plurality of electronic instruments for wirelessly transmitting and receiving data among the plurality of electronic instruments, the wireless communication apparatus comprising:

communication means for performing wireless data transmission and reception with a communication apparatus of other electronic instrument;

storage means for storing identification information and a secret algorithm of an electronic instrument to which the wireless communication apparatus belongs;

conversion means for converting data by using identification information of the other electronic instrument and a secret algorithm of the electronic instrument to which the wireless communication apparatus belongs to transmit the converted data to the other electronic instrument through the communication means, and for reconverting another converted data transmitted from the other electronic instrument to the communication means into an original form by using identification information of the other electronic instrument and a secret algorithm of the electronic instrument to which the wireless communication apparatus belongs; and control means for sending identification information of the electronic instrument to which the wireless communication apparatus belongs toward the other electronic instrument and for receiving identification information of the other electronic instrument through the communication means before the transmission and reception of the converted data.

The conversion means may comprise:

encrypting means for encrypting data by using identification information of the other electronic instrument and a secret algorithm of the electronic instrument to which the wireless communication apparatus belongs; and decrypting means for decrypting encrypted data from the other electronic instrument by using identification information of the other electronic instrument and a secret algorithm of the electronic instrument to which the wireless communication apparatus belongs.

The encrypting means may generate a cryptographic key from identification information of the other electronic instrument and a secret algorithm of the electronic instrument to which the wireless communication apparatus belongs, and may encrypt data by a cryptographic program utilizing the cryptographic key; and the decrypting means may generate a cryptographic key from identification information of the other electronic instrument and a secret algorithm of the electronic instrument to which the wireless communication apparatus belongs, and may decrypt encrypted data by a cryptographic program utilizing the cryptographic key.

According to a third aspect of this invention, there is provided a wireless communication system for wirelessly transmitting and receiving data among a plurality of electronic instruments, each of the electronic instruments having identification information and a secret algorithm, wherein each of the electronic instruments comprises:

first means for mutually exchanging identification information with other electronic instrument which is a partner of wireless communication before performing data communication; and second means for performing transmission and reception of encrypted data with the partner electronic instrument with which identification information has been mutually exchanged; and wherein the second means includes:

conversion/transmission means for generating a cryptographic key by using identification information of the partner electronic instrument and a secret algorithm of each of the electronic instruments to encrypt data by a cryptographic program utilizing the cryptographic key into encrypted data which is in turn transmitted to the partner electronic instrument; and reception/decryption means for generating a cryptographic key by using identification information of the partner electronic instrument and a secret algorithm of each of the electronic instruments to decrypt encrypted data from the partner electronic instrument by a cryptographic program utilizing the cryptographic key.

According to a fourth aspect of this invention, there is provided an information storage medium provided in an electronic instrument which wirelessly transmits and receives encrypted data relating to other electronic instrument, storing:

first information including identification information and a secret algorithm of the electronic instrument to which the information storage medium is included:

second information for exchanging mutually identification information with the other electronic instrument before wireless communication; and third information for carrying out transmission and reception of encrypted data between the electronic instrument to which the information storage medium is included and the other electronic instrument;

wherein the third information includes:

information for generating a cryptographic key from identification information of the other electronic instrument and a secret algorithm of the electronic instrument to which the information storage medium is included, and for encrypting data by a cryptographic program utilizing the cryptographic key to transmit encrypted data to the other electronic instrument; and information for generating a cryptographic key from identification information of the other electronic instrument and a secret algorithm of the electronic instrument to which the information storage medium is included, and for decrypting encrypted data from the other electronic instrument by a cryptographic program utilizing the cryptographic key.

The identification information and secret algorithm of each of the electronic instruments have been proposed, for example, in the Transactions of the Institute of Electronics, Information and Communication Engineers A, Vol. J71-A, No. 11, pp. 2046–2053, November 1988. It is preferable that each electronic instrument has its own identification information. More particularly, the identification information and secret algorithms of the electronic instruments are those as used in the Key Predistribution System (KPS) in which they are used to generate a cryptographic key, and a cryptographic program using this cryptographic key is used to encrypt data, thus permitting all the electronic instruments to use the same cryptographic key without communicating the key itself.

When there are two electronic instruments, one of the electronic instruments uses the identification information of the other electronic instrument and its own secret algorithm to generate the cryptographic key while the other electronic instrument uses the identification information of the one of the electronic instruments and its own inherent secret algorithm.

According to KPS, it is difficult to decrypt the encrypted data from the other electronic instrument, if the identification information of the other electronic instrument and the secret algorithm of the one of the electronic instruments are not used. It is also difficult to decrypt the encrypted data from the one of the electronic instruments if the identification information of the one of the electronic instrument and the secret algorithm of the other electronic instrument are not used. Thus, the safety for transmitting data can be improved.

One of the data encryption systems according to the prior art may be such that a cryptographic key registering system distributes a cryptographic key to each of the electronic instruments. On the contrary, the KPS encryption system generates a cryptographic key in each of the electronic instruments. This eliminates any cryptographic key registering system, leading to reduction of cost required to construct the system.

According to the present invention, transmission and reception of encrypted data can be wirelessly performed between two electronic instruments without previous provision of any cryptographic key. This is extremely convenient when the transmission/reception of data is to be performed between any two electronic instruments.

The information storage medium may be of any type such as floppy disc, memory card, IC card or built-in ROM.

The transmission/reception of data among electronic instruments described above can be performed similarly between a computer and a printer, between two computers, or among various different electronic instruments.

The one of the two electronic instruments may be a computer which encrypts data for printing before transmission, and the other electronic instrument may be a printer which decrypts the encrypted data before printing.

The two electronic instruments may be computers which encrypt data, and transmit and receive the encrypted data.

Each of the electronic instruments may be a computer which encrypts data for transmission and reception.

The wireless transmission/reception of data may be performed between the independent electronic instruments, or between an electronic instrument belonging to a network and another electronic instrument not belonging to the network.

The encrypted data may be wirelessly exchanged between an electronic instrument belonging to a first wireless network and another electronic instrument which does not belongs to the first wireless network.

The first step may include:

a network information transmission step in which network information including identification information of the electronic instrument which belongs to the first wireless network is wirelessly transmitted through an access point for the first wireless network repeatedly;

an identification information obtaining step in which the other electronic instrument which does not belongs to the first wireless network receives the network information to obtain identification information of the electronic instrument which is a partner for wireless communication and belongs to the first wireless network; and an identification information provision step in which the electronic instrument which does not belongs to the first wireless network transmits its own identification information to the partner electronic instrument belonging to the first wireless network.

The wireless communication system may further comprise a first wireless network including a plurality of electronic instruments, and an electronic instrument not belonging to the first wireless network;

wherein the first wireless network includes an access point for repeatedly transmitting network information which includes identification information of electronic instruments belonging to the first wireless network;

wherein the electronic instrument not belonging to the first wireless network includes means for obtaining identification information of an electronic instrument which is a partner of wireless communication and for transmitting its own identification information to this partner electronic instrument; and wherein the partner electronic instrument includes means for receiving identification information of the electronic instrument not belonging to the first wireless network.

The wireless transmission/reception of encrypted data can be performed between an electronic instrument belonging to a wireless network and another electronic instrument not belonging to the network.

The wireless transmission of the network information including the identification information of the electronic instrument belonging to the first wireless network can be repeatedly performed through the access point of the first wireless network.

Therefore, the electronic instrument not belonging to the first wireless network can mutually exchange the identification information with any other electronic instrument by receiving the network information repeatedly transmitted from the access point and transmitting its own identification information to the other electronic instrument.

In such a manner, the transmission/reception of encrypted data can be well performed between the electronic instrument belonging to the wireless network and the other electronic instrument not belonging to the wireless network.

The access point in the wireless network may be a dedicated instrument, but is preferably an electronic instrument which itself performs the transmission/reception of data with any other electronic instrument, from the viewpoint of executing a more effective network control.

The identification information provision step may be carried out through an electronic instrument which functions as the access point.

Furthermore, the transmission/reception of data may be performed directly between two electronic instruments without interposition of the access point after the identification information has been mutually exchanged as described.

The second step may be carried out directly between the two electronic instruments.

If a plurality of wireless networks are interconnected to one another through access points, the exchange of identification information and the transmission/reception of encrypted data may be performed between an electronic instrument not belonging to the first wireless network and an electronic instrument belonging to any other network which is connected to the electronic instrument not belonging to the first wireless network through the access point of the first wireless network.

The network information may include identification information of an electronic instrument which belongs to the other wireless network connected to the first wireless network through an access point;

in the identification information obtaining step, the electronic instrument not belonging to the first wireless network may obtain identification information of an electronic instrument of the other wireless network from the network information;

in the identification information provision step, the electronic instrument not belonging to the first wireless network may transmit its own identification information to the electronic instrument of the other wireless network; and in the second step, encrypted data may be mutually transmitted and received by the two electronic instruments which has obtained mutual identification information.

The identification information of each of the electronic instruments may be a medium access control (MAC) address or an internet protocol (IP) address.

The identification information may be a MAC address or an IP address.

The wireless communication apparatus as defined in claims 12–17 may be built in an electronic instrument or removably mounted in an electronic instrument.

The wireless communication apparatus may be included in an electronic instrument.

The wireless communication apparatus may be removably mounted in an electronic instrument.

The encryption/decryption of data according to KPS can be easily carried out by removably mounting a hardware device which has its own identification information and secret algorithm on an electronic instrument.

DETAILED DESCRIPTION OF PREFERRED EMBODIMENTS

Some preferred embodiments of the present invention will now be described.

1. First Embodiment

Basic Layout

Figure 1:
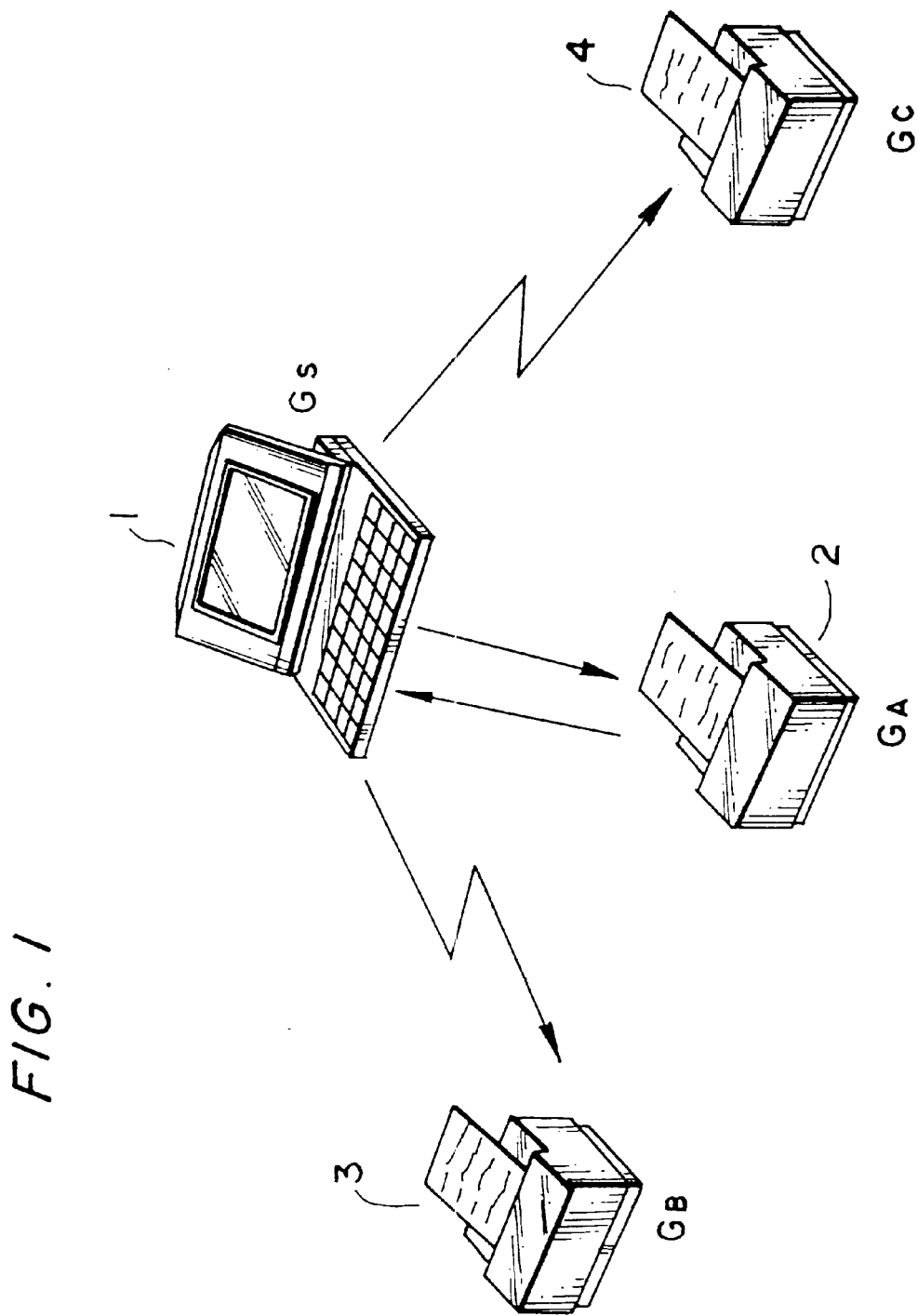
FIG. 1 illustrates a wireless communication method according to the present invention.

FIG. 1 shows one preferred embodiment of a wireless system to which the present invention is applied.

This system is in the form of a wireless communication apparatus for performing the wireless transmission/reception of data, which comprises a personal computer (PC) 1 and three printers 2, 3 and 4. The PC 1 transmits encrypted data to any desired printer among the three printers 2, 3 and 4. The desired printer receives and decrypts the encrypted data into the original data. Such data will be printed by this printer.

A case where transmission and reception of data are performed between the PC 1 and the printer 2 will be described in more detail.

Figure 2:
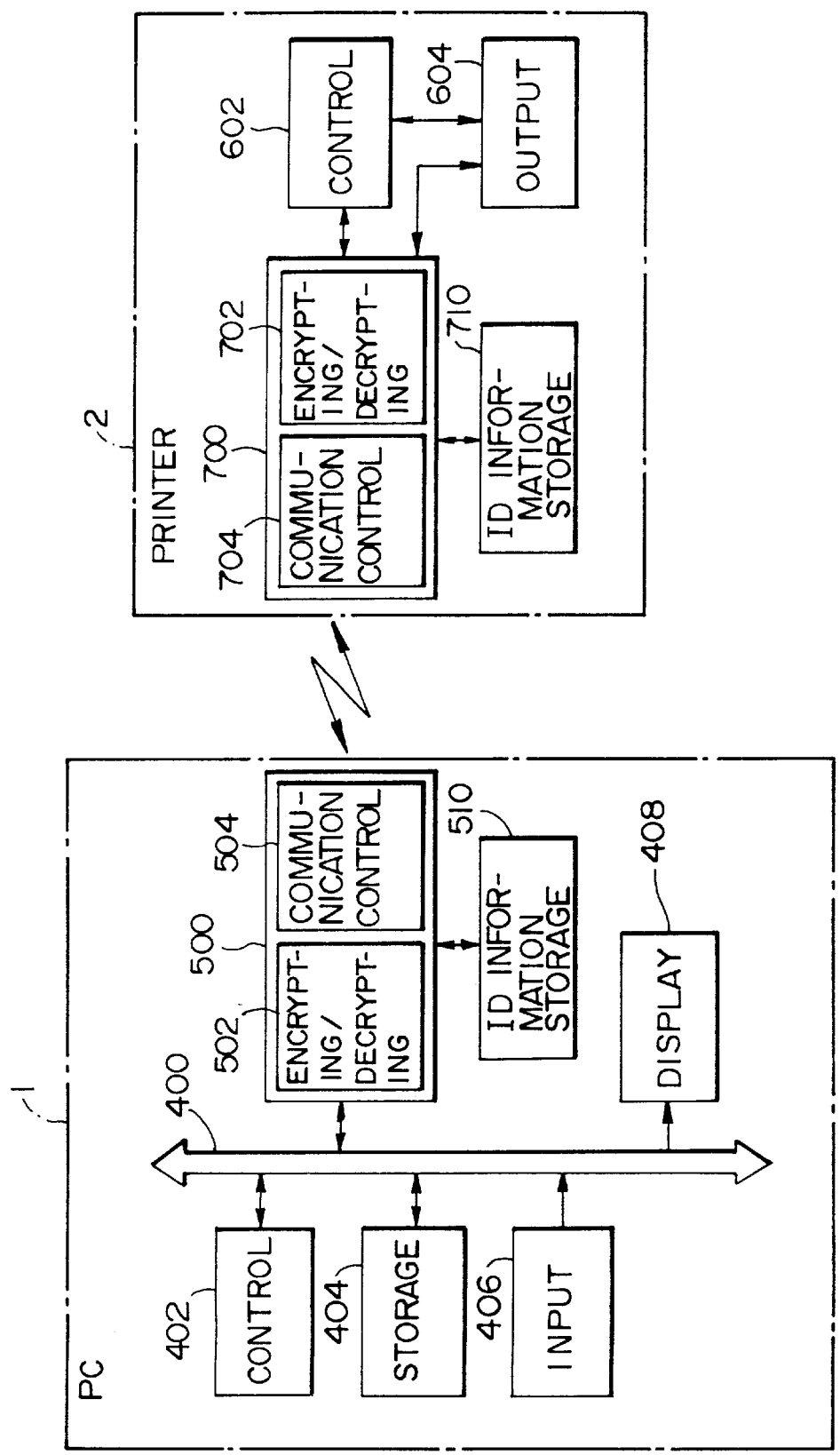
FIG. 2 is a schematic block diagram of a personal computer (PC) and a printer all of which use the wireless communication method according to the present invention.

The schematic layout of PC 1 and printer 2 is shown in FIG. 2.

PC 1 includes a storage section 404, a display section 408, an information/command input section 406, a communication section 500 for performing transmission and reception of data and a control section 402, all being connected to a bus 400.

The input section 406 includes a keyboard, mouse or the like. Information from the input section 406 is input to the control section 402 through the bus 400. In response to the inputted information, the control section 402 writes data in the storage section 404, reads data out of the storage section 404, or displays data on the display section 408 or a monitor. Control commands are transmitted from the control section 402 through the bus 400 to the storage section 404, input section 406, display section 408 and communication section 500. Information from the input section 406 and the storage section 404 are also transmitted to the control section 402, display section 408 or communication section 500 through the bus 400.

The communication section 500 controls transmission and reception of data with respect to any other electronic instrument. The communication section 500 comprises an encrypting/decrypting section 502 for encrypting data to be transmitted and also decrypting encrypted data, and a communication control section 504 for controlling transmission and reception of encrypted data. The communication section 500 is connected to an identification (ID) information storage section 510 which stores the identification information and secret algorithm of the PC1. These identification information and secret algorithm are used to generate a cryptographic key for encryption and decryption of data.

On the other hand, the printer 2 comprises an output section 604 for printing data, a communication system 700 for performing transmission and reception of data with respect to any other electronic instrument, an identification (ID) information storage section 710 and a control section 602 for controlling the operation of each of the sections.

The communication section 700 is similar in structure to the communication section 500 in the PC 1 and comprises an encrypting/decrypting section 702 having the same function as that of the encrypting/decrypting section 502 and a communication control section 704 having the same function as that of the communication control section 504. The ID information storage section 710 is also similar in structure to the aforementioned ID information storage section 510 in the form of an IC which has stored the ID information and secret algorithm of the printer 2.

Each of the communication control sections 504, 704 may include means for wirelessly transmitting and receiving data.

The PC 1 and printer 2 encrypt and decrypt data through KPS. By using KPS, the PC 1 and printer 2 respectively generate a common cryptographic key, and use this cryptographic key to encrypt and decrypt data. The cryptographic key is generated by using an ID information of any other electronic instrument to which data is to be transmitted and the secret algorithm of an electronic instrument from which data is to be transmitted.

It is to be noted that the PC1 requires the ID information of the printer 2 and the printer 2 requires the ID information of the PC1. Therefore, it is necessary to exchange the ID information between the PC 1 and the printer 2.

Exchange of ID information (First Step)

Exchange of the ID information between the PC 1 and the printer 2 will be described.

Under control of the control section 402, a transmission request command for the ID information of the printer 2 is transmitted from the communication section 500 of the PC 1 to the printer 2.

The printer 2 receives the transmission request command through the communication section 700. The transmission request command is then fed to the control section 602 which is in turn responsive to this transmission request command for controlling the communication section 700. The communication section 700 reads the ID information out of the ID information storage section 710. The ID information of this printer 2 is transmitted to the PC 1 through the communication section 700 under control of the communication control section 704.

PC 1 receives and stores the transmitted ID information of the printer 2 at its communication control section 504. The communication section 500 reads ID information of the PC 1 which is stored in the ID information storage section 510. The ID information of the PC 1 is then transmitted to the printer 2 under control of the communication control section 504.

The transmitted ID information of the PC 1 is received and stored by the communication control section 704.

Encryption and decryption of data will now be described.

The encrypting/decrypting section 502 in the PC 1 generates a cryptographic key by using the ID information of the printer 2 and the secret algorithm of the PC 1 itself.

Data stored in the storage section 404 of the PC1 is transmitted to the encrypting/decrypting section 502 through the bus 400 under control of the control section 402. The encrypting/decrypting section 502 encrypts the transmitted data into the encrypted data according to a cryptographic program which utilizes the cryptographic key. The encrypted data is transmitted to the printer 2 under control of the communication control section 504.

The encrypted data from the PC 1 is received by the communication control section 704 of the printer 2 and then fed to the encrypting/decrypting section 702. The encrypting/decrypting section 702 generates a cryptographic key from the received ID information of the PC 1 and the secret algorithm of the printer 2 itself and also produces a cryptographic program using this cryptographic key. The cryptographic program is used to decrypt the received encrypted data. Thus, the original data can be obtained. The original data is then fed to the output section 604 under control of the control section 602. The output section 604 outputs and prints the data.

Figure 3:
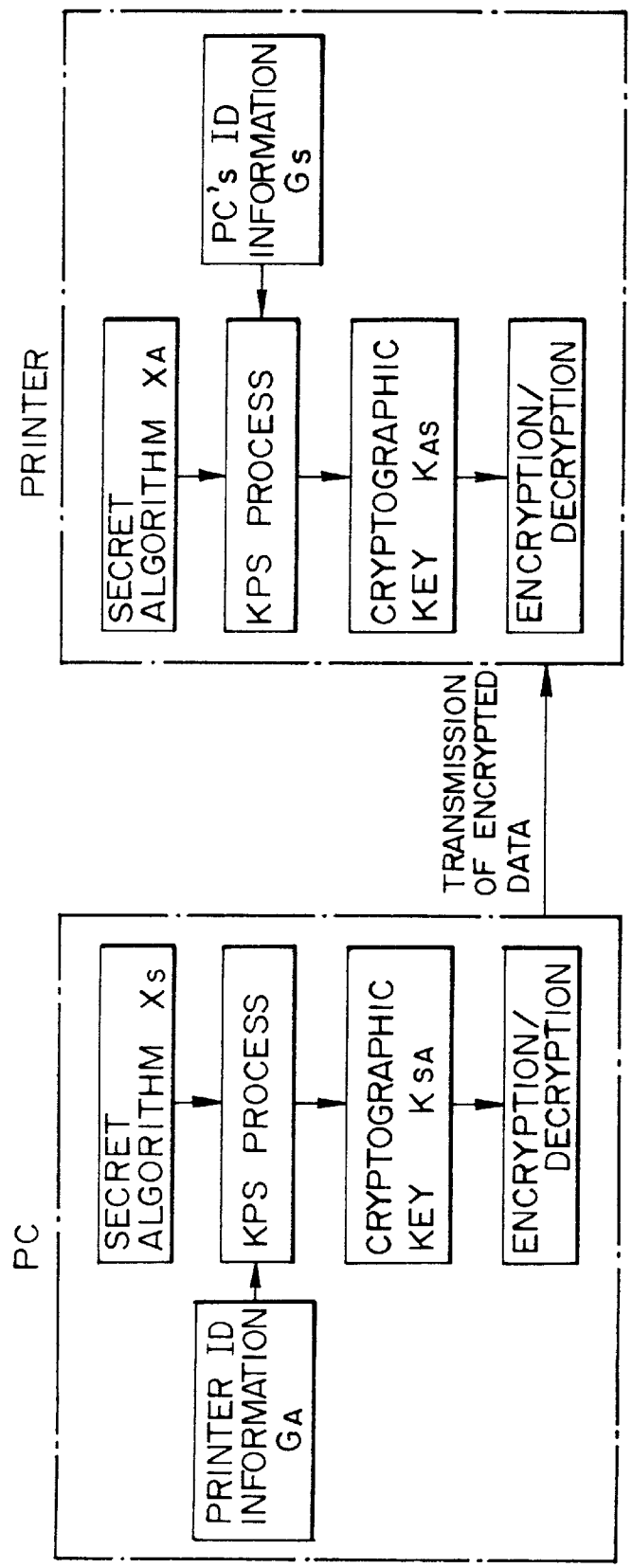
FIGS. 3A and 3B illustrate the encryption and decryption of data.

More particularly, as shown in FIG. 3A, the PC 1 generates a cryptographic key $K_{3A}$ from the ID information $G_A$ of the printer 2 and the secret algorithm $X_s$ of the PC 1 itself in accordance with the KPS process. An encryption program using this cryptographic key $K_{3A}$ encrypts the data.

As shown in FIG. 3B, the printer 2 also generates a cryptographic key $K_{AS}$ from the ID information $G_S$ of the PC 1 itself, and the secret algorithm $X_A$ of the printer 2 itself in accordance with the KPS process. The cryptographic key $K_{AS}$ is identical with the cryptographic key $K_{SA}$ generated in the PC 1. The decryption program using this cryptographic key $K_{AS}$ decrypts the received encrypted data.

If the name, telephone number, E-mail address of the user of the PC 1 or the like are used as the ID information, it is not required to provide any additional data as the ID information previously. This more facilitates encrypting and decrypting of data. Similarly, the medium access control (MAC) address or the internet protocol (IP) address may be used as the ID information.

The MAC address is a 48-bit unique Universal Address in a worldwide LAN, specified by Institute of Electrical and Electronics Engineers (IEEE) Standard 802–1990. The IP address is a 32-bit address used for identifying a particular node among a number of nodes connected to a network, shown in Request for Comments (RFC) 950, for example. An IP address is usually represented as four decimal numbers, each representing eight bits, separated by periods.

Operational Flowchart

Figure 4:
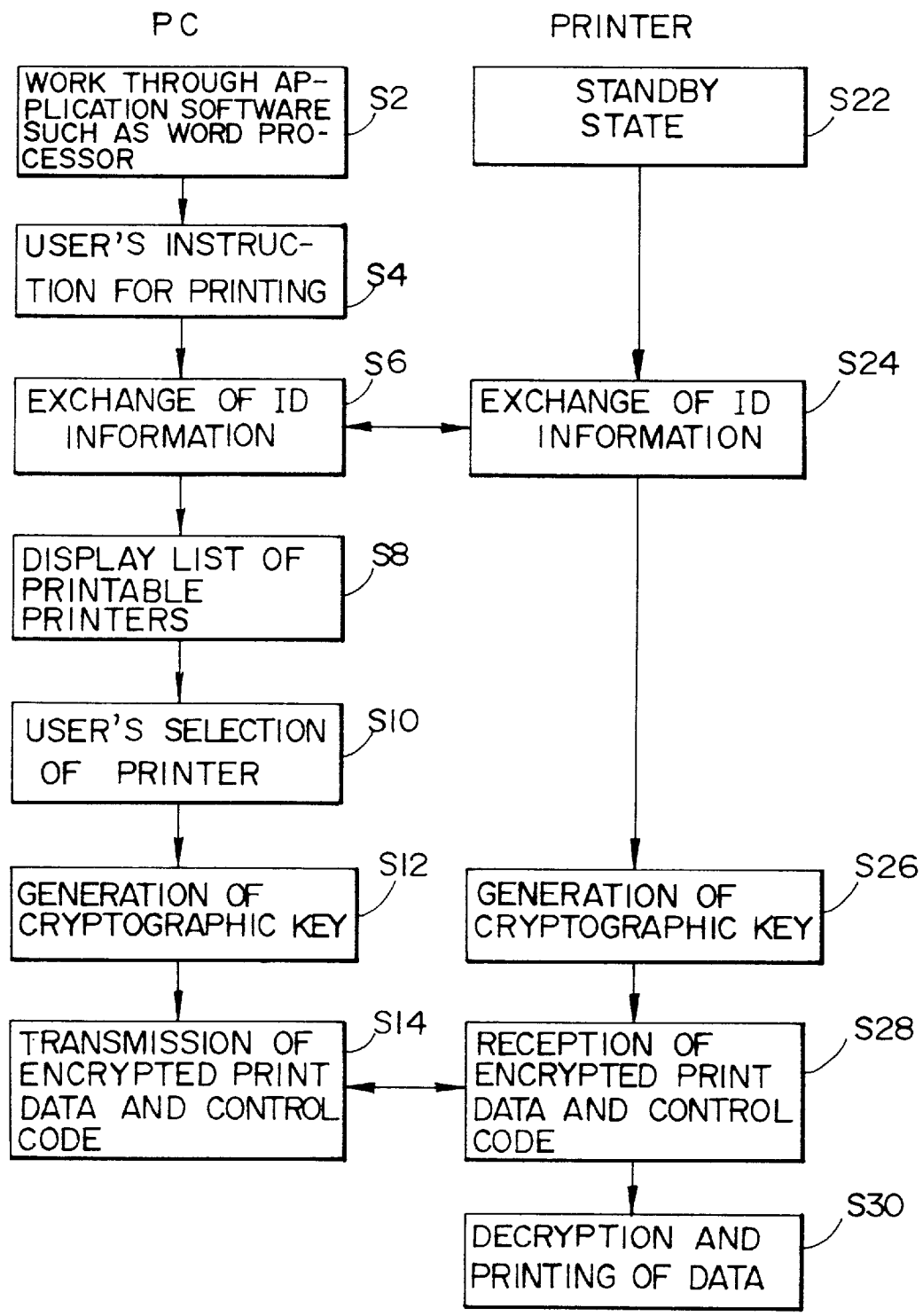
FIG. 4 is a flowchart illustrating a procedure of data transmission/reception between PC and a printer.

FIG. 4 shows a concrete procedure in which the PC 1 selects a printer 2 and prints data in the system of FIG. 1.

At step S2, first, the PC 1 uses an application such as a word processing software to prepare data.

At step S4, thereafter, the user manipulates the input section 406 to select a print command displayed in the display section 408. This command is fed to the control section 402.

The printers 2, 3 and 4 have been turned on and placed in their printable or standby state, at step S22.

At step S6, the control section 402 of the PC 1 transmits a transmission request command for an ID information to the printers 2, 3 and 4.

At step S24, the printers 2, 3 and 4 respectively receive the transmission request command and then send their ID information $G_A$, $G_B$ and $G_C$ to the PC 1.

The PC 1 receives and stores the ID information $G_A$, $G_B$ and $G_C$ of the printers 2, 3 and 4. The PC 1 sends in turn its own ID information $G_S$ to the printers 2, 3 and 4. The printers 2, 3 and 4 receive and store the ID information $G_S$ of the PC 1, respectively.

At step S8, thereafter, the display section 408 of the PC 1 displays a list of printable printers based on the received ID information of the printers. Since all the printers 2, 3 and 4 are in their standby state as described, the list contains the names of the printers 2, 3 and 4.

At step S10, the user manipulates the input section 406 for selecting any desired printer from the list. It is now assumed that the printer 2 is selected.

At step S12, the PC 1 generates a cryptographic key using the ID information $G_A$ of the printer 2 and the secret program $X_S$ of the PC 1 itself. At step S26, the printer 2 also generates a cryptographic key using the ID $G_S$ of the PC 1 and the secret algorithm $X_A$ of the printer 2 itself.

At step S14, the PC 1 encrypts the data in accordance with the cryptographic program which utilizes the generated cryptographic key. To the printer 2, the PC 1 sends the encrypted data and a print control code that is a control data for printing.

On the other hand, at step S28, the printer 2 receives the encrypted data as well as the print control code.

At step S30, the encrypted data is decrypted into the original data by the cryptographic program using the cryptographic key generated by the printer 2.

Thereafter, the printer 2 prints the data according to the received print control code. The printer 2 also sends another print control code indicative of whether or not the printing is normally carried out to the PC 1. When the PC 1 receives this print control code from the printer 2, the former judges whether or not the printing was normally performed in the printer 2.

When data is mutually transmitted between electronic instruments, the safety of the data can be effectively improved by encrypting the data with the ID information of the electronic instruments, because it is difficult to cryptanalize the encrypted data even if the data is intercepted during transmission.

Although the first aforementioned embodiment has been described as to the cryptographic communication using KPS between the PC and the printers, the present invention is not limited to this embodiment, but may be applied to the cryptographic communication between any other electronic instruments through KPS. The transmission/reception of encrypted data may be performed between PCs or between a computer and a network or between a computer and any other electronic instrument such as projector, through KPS.

Concrete Procedure of Encryption through KPS

A concrete procedure of encryption will now be described in a simple manner.

At first, the procedure of generating a cryptographic key will be described.

(1) This procedure is described taking the generation of a common cryptographic key by first and second electronic instruments 1 and 2 through KPS as an example. In this case, each of the electronic instruments 1 and 2 has previously stored symmetric n×n matrixes equal to k in number which will be called "G". If there is any other electronic instrument producing the common cryptographic key, this other electronic instrument has also pre-registered k symmetric matrixes which is called "G".

"G" must be kept secret. It is now assumed that n is the number of cooperations and k is the number of bits in the common cryptographic key to be generated.

The k symmetric matrixes in the "G" are designated M1, M2 . . . MK.

(2) KPS-ID that is the identification information of each of the electronic instruments 1 and 2 which will be simply referred to "ID" is determined. It is assumed herein that the first electronic instrument 1 has its ID1 while the second electronic instrument 2 has its ID2. These ID information can be MAC addresses in the electronic instruments.

(3) A unidirectional function h(x) is used to expand each ID information into a length of n-bit in a random manner. It is assumed that h(ID1)=R1 and h(ID2)=R2. R1 and R2 will be referred to execution ID information.

(4) $M_i * R$ (]=1, 2 ... k) has been previously calculated and stored in the first electronic instrument 1 as its secret algorithm x1. Similarly, $M_i * R$ (]=1, 2 ... k) has been previously calculated and stored in the second electronic instrument 2 as its secret algorithm x2. Alternatively, a function of calculating the unidirectional function h(x) could be provided to the electronic instruments 1 and 2.

Figure 5:
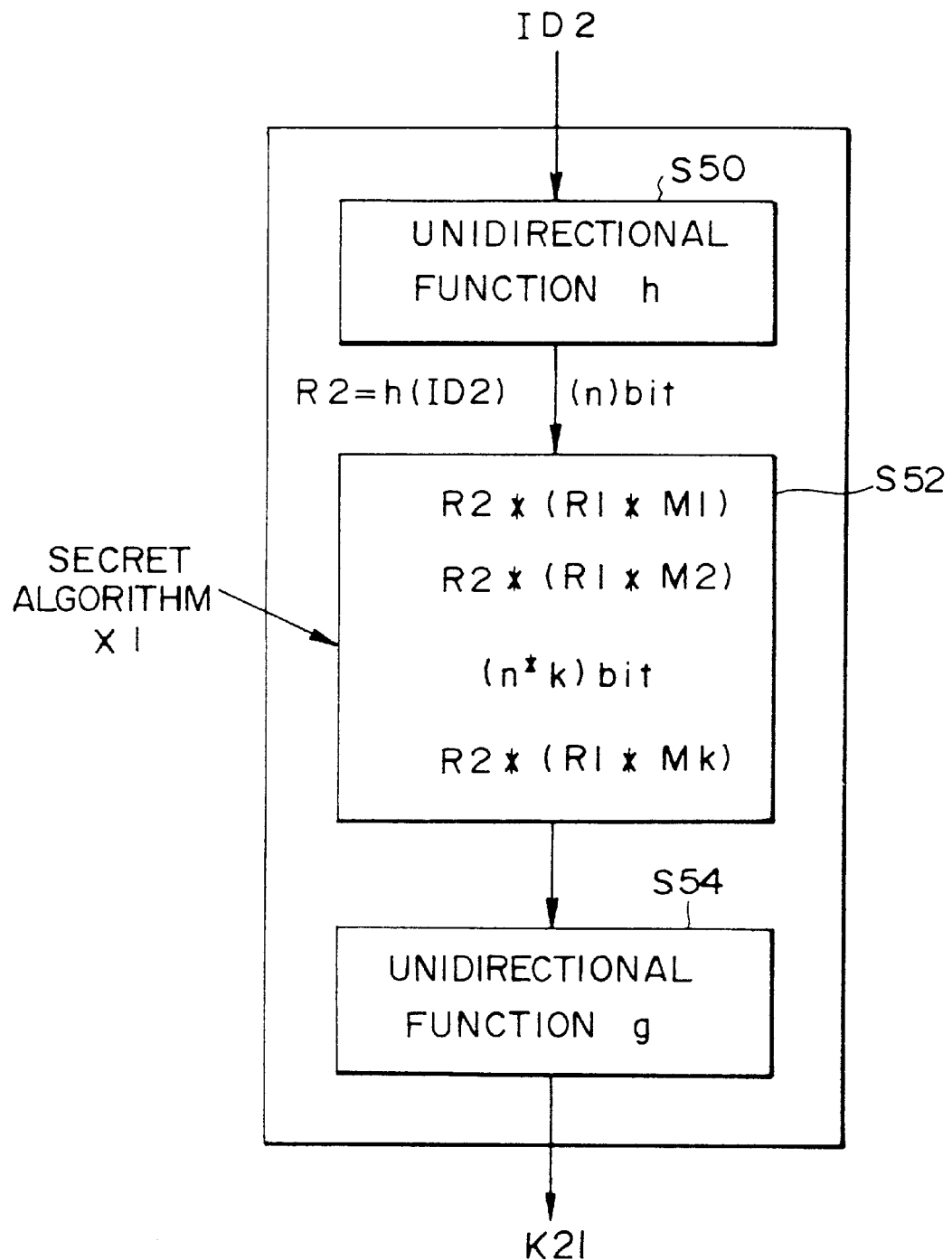
FIG. 5 illustrates a procedure of generating a cryptographic key.

(5) FIG. 5 shows a procedureof generating a common cryptographic key for all the electronic instruments.

Before transmission and reception of data, the first and second electronic instruments 1 and 2 mutually exchange their ID information.

Thereafter, each of the electronic instruments generates a common cryptographic key $K_{21}$ from the ID information of the other electronic instrument and its own secret algorithm.

First, a case when the first electronic instrument 1 receives ID2 from the second electronic instrument 2 to generate the common cryptographic key $K_{21}$ will be described.

The first electronic instrument 1 calculates ID2 of the second electronic instrument 2 through the unidirectional function h to determine R2 which is the execution ID information of the second electronic instrument 2 represented as h (ID2)=R2 (step S50).

The first electronic instrument then calculates the product of the resultant R2 and its own secret algorithm 2, that is, R2 * X1. The result is processed by the unidirectional function g to obtain a common cryptographic key $k_{21}$ (steps S52, S54).

The second electronic instrument 2 also determines the execution ID information, R1=h(ID1), from ID1 of the first electronic instrument 1 through the unidirectional function h. The second electronic instrument 2 then calculates the product of the resultant 1 and its own secret algorithm X. The resultant product is further calculated to obtain a common cryptographic key $K_{12}$ through the unidirectional function g.

Since the aforementioned $M_i$ is a symmetric matrix, $K_{21}$ is equal to $K_{12}$. This means that the common cryptographic keys $K_{21}$ and $K_{12}$ generated in the electronic instruments 1 and 2 are identical with each other.

Figure 6:
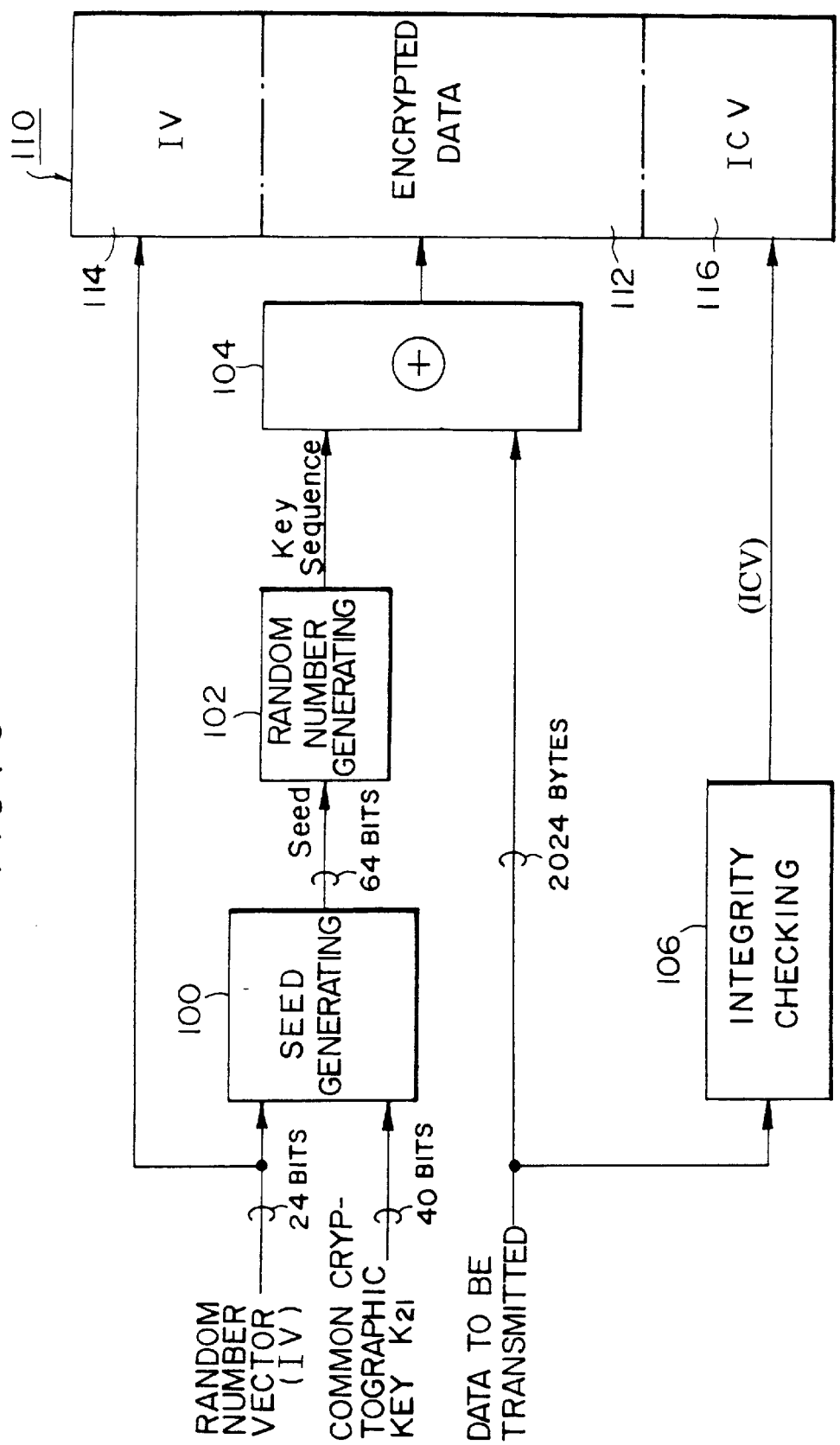
FIG. 6 illustrates an algorithm for encryption of data by a cryptographic key.
Figure 7:
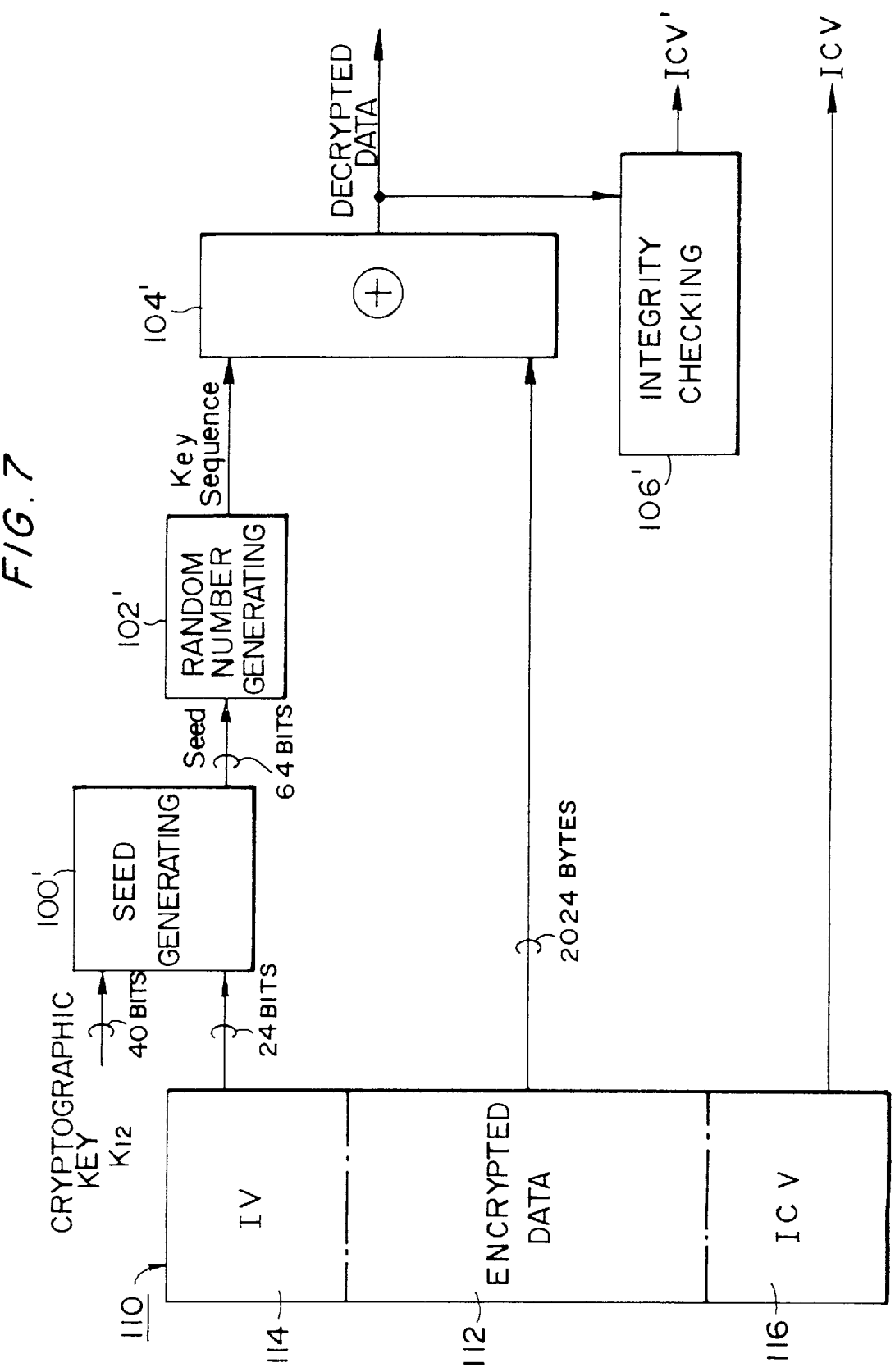
FIG. 7 illustrates an algorithm for decrypting the encrypted data by a cryptographic key.

FIG. 6 shows a functional block diagram illustrating a preparation of encrypted data by using the common cryptographic key. FIG. 7 is a functional block diagram of a data decrypting process.

In the first embodiment, the concrete structure for encryption and decryption shown in FIGS. 6 and 7 is provided in the encrypting/decrypting section 502 of the PC 1 and the encrypting/decrypting section 702 of the printer 2, respectively.

First, the procedure of encryption will be described with reference to FIG. 6. For simplicity, it is assumed that the first electronic instrument 1 encrypts transmitted data using the procedure shown in FIG. 6, and the second electronic instrument 2 decrypts the encrypted data using the procedure shown in FIG. 7.

As shown in FIG. 6, a 24-bit random number is produced and used as an initialization vector IV. The random number is inputted into a seed generating section 100. In this case, the common cryptographic key $K_{21}$ is a 40-bit data. The seed generating section 100 produces sequences of 64-bit data from the common cryptographic key $k_{21}$ and the random number vector IV.

A random number generating section 102 having WEP PRNG (pseudo-random number generator) generates a pseudo-random number from the produced seed, the pseudo random number being then inputted into an EXCLUSIVE-OR operation section 104 as key sequence data.

The EXCLUSIVE-OR operation section 104 uses the inputted key sequence data to perform an EXCLUSIVE-OR operation to the data to be transmitted for one bit at a time. Thus, the data will be converted into an encrypted data 112.

On the other hand, the integrity of the data to be transmitted is checked by an integrity checking section 106. An integrity check value is then outputted as ICV 116. In this case, ICV 116 may contain data showing the property of plaintext data such as the checksum data.

The encrypted data 112, ICV 116 and 24-bit random number vector IV given as an initialization vector are combined into a set of message data 110 which is in turn transmitted to the second electronic instrument 2.

After the second electronic instrument 2 receives such a message data 110, the random number vector 114 contained in the message data 110 is inputted into a seed generating section 110', as shown in FIG. 7.

The see generating section 110' generates sequences of 64-bit data called "seed" from the random number vector IV and the aforementioned common cryptographic key $K_{12}$ in accordance with an algorithm similar to that of the seed generating section 100 shown in FIG. 6. The common cryptographic key $K_{12}$ and random number vector IV used herein are identical with the common key $K_{21}$ and random number vector IV used in FIG. 6. Therefore, the contents of the seed generated by the seed generating section 100' become identical with those of the seed generating section 100.

The resultant seed is converted into a pseudo-random number called "sequence" in the random number generating section 102. The structure and algorithm of the random number generating section 102' are similar to those of the random number generating section 102 shown in FIG. 6. Therefore, the contents of the key sequence data obtained by the random number generating section 102' are completely identical with the contents of the key sequence data generated by the random number generating section 102.

An EXCLUSIVE-OR operation section 104' uses the resultant key sequence data to perform the EXCLUSIVE-OR operation to the encrypted data 112 for one bit at a time so that the encrypted data will be decrypted.

Thus, the encrypted data can be exactly decrypted into the original data.

After the data has been decrypted, it is checked by an integrity checking section 106' in accordance with an integrity check algorithm. An integrity check value is then outputted as ICV'. The integrity check algorithm is similar to that in the integrity checking section 106 shown in FIG. 6.

If the contents of ICCV' are identical with the contents of ICV in the received message data 110, it is then determined that the decrypted data is perfect. If not so, it will be determined that the received data is altered during the transmission. Such a data will be discarded.

2. Second Embodiment

A method of realizing the encryption/decryption of data through KPS as well as the transmission/reception of encrypted data in an electronic instruments which does not have such functions will be described.

The realization of the KPS encryption/decryption in a software will first be described.

Figure 8:
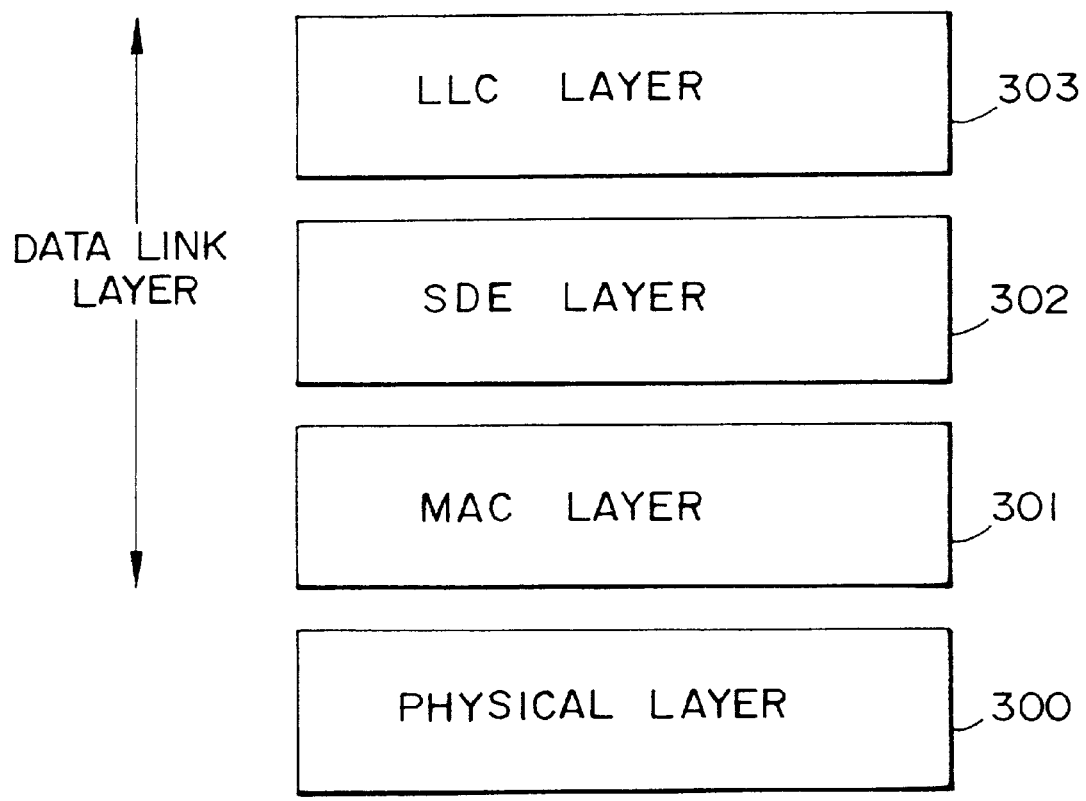
FIG. 8 illustrates a method of realizing the encryption/decryption of data according to KPS in a software manner.

Such a software can be provided in the form of a protocol indicative of a standard for a procedure of data transmission as shown in FIG. 8.

This protocol includes data link layers and a physical layer of OSI reference model. More particularly, the protocol comprises a physical layer 300, a medium access control (MAC) layer 301, a secure data exchange (SDE) layer 302 and a logical link control (LLC) layer 303 in the sequence starting from the bottom layer.

The lowermost or physical layer 300 indicates a standard of physical specification for a communication such as data modulation system or the like.

The MAC layer 301 directly above the physical layer 300 indicates a standard for data transfer speed, data format, data transmission direction, data protocol control, data encryption/decryption and the like. In this case, the data encryption/decryption process uses KPS in which the exchange of the ID information between two electronic instruments is performed to generate a common cryptographic key from their ID information and secret algorithms. Since this has been previously described in detail, further description thereof is omitted.

The SDE layer 302 directly above the MAC layer 301 indicates a standard of data encryption/decryption different from that of the MAC layer 301. The SDE layer 302 uses a data encryption/decryption process which is more secure than that of the MAC layer 301 to increase the security.

The LLC layer 303 directly above the SDE layer 302 indicates a procedure of data transmission/reception independent of the MAC layer 301. Since the specification thereof is not unique to this protocol, further description is omitted.

The software provided in the form of this protocol may be stored in a portable information storage medium such as a floppy disc, a memory card, or an IC card. An electronic instrument reads the protocol software out of the portable information storage medium and then performs the data encryption/decryption and the transmission/reception of encrypted data through KPS.

A case when the KPS encryption/decryption process is realized in hardware will be described.

Figure 9:
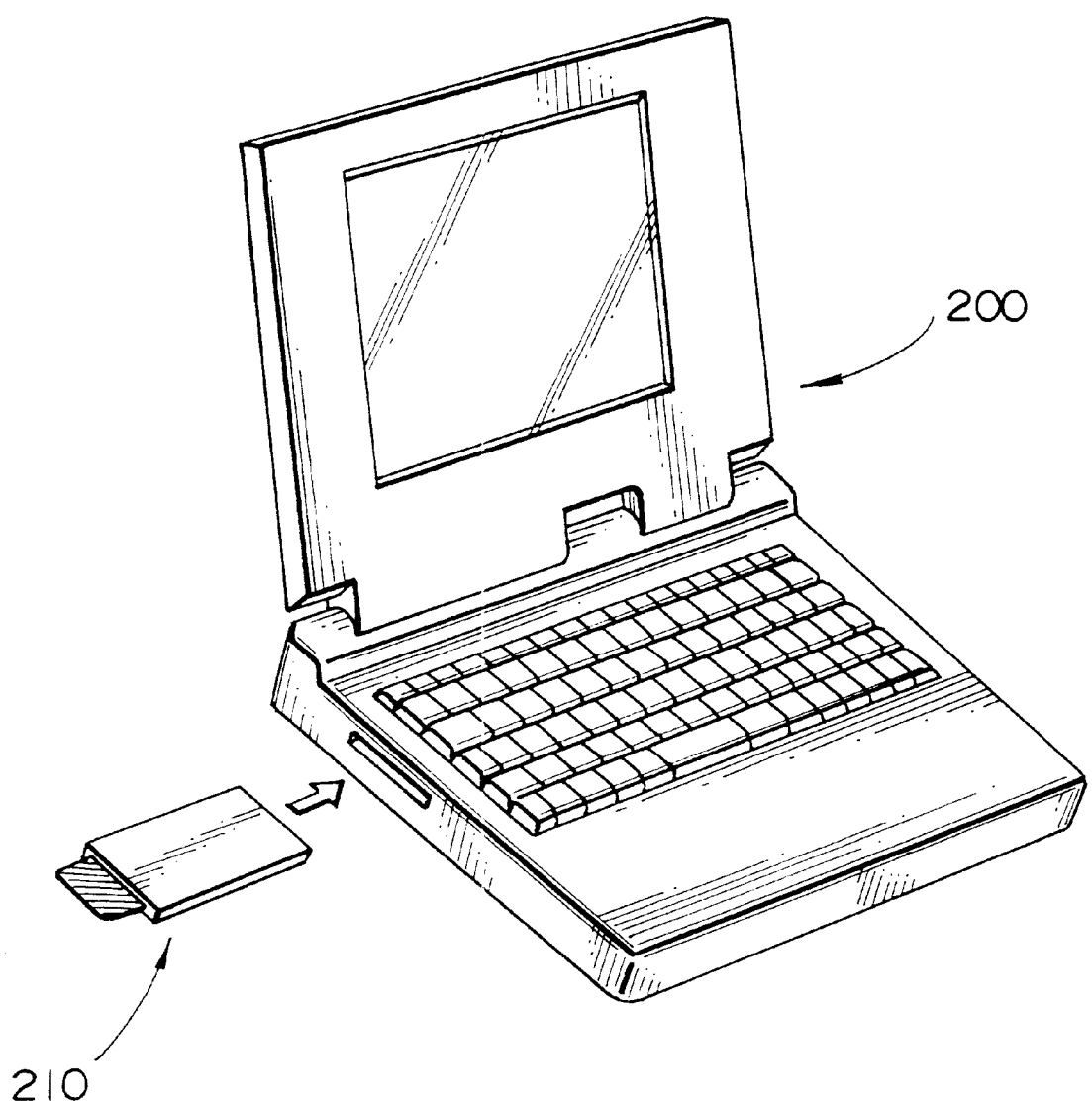
FIG. 9 illustrates a method of realizing the encryption/decryption of data according to KPS in a hardware manner.

The hardware used herein may be in the form of a PC card type cryptographic communication device 210 for wireless communication which can be used in a notebook-sized PC, for example, for the serious mobile computing age, as shown in FIG. 9.

Figure 10:
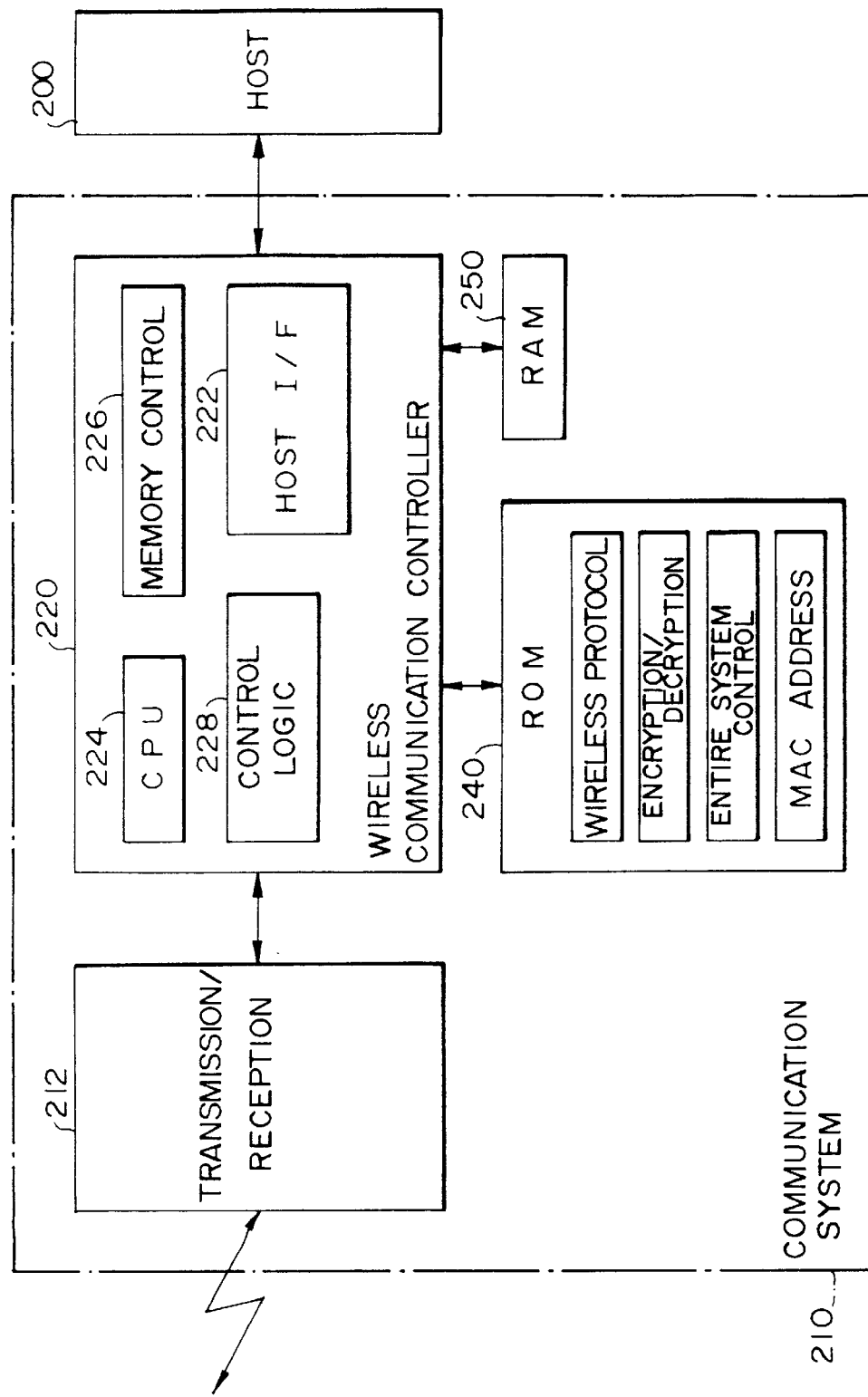
FIG. 10 is a functional block diagram of the hardware shown in FIG. 9.

FIG. 10 is a functional block diagram of the cryptographic communication device 210 which is connected to an electronic instrument 200 such as a notebook-sized PC.

The cryptographic communication device 210 comprises a transmission/reception section 212, a wireless communication controller 220, a ROM 240 in which various information have been stored and a RAM 250 used as a work area or the like.

The transmission/reception section 212 performs the wireless transmission of a digital signal from the wireless communication controller 220 to any other electronic instrument as an analog signal and converts an analog signal from other electronic instruments into a digital signal which is in turn inputted into the wireless communication controller 220.

The transmission/reception section 212 may perform the wireless transmission/reception to other electronic instruments not only by a radio wave, but also through infrared ray or other wireless communication medium.

The wireless communication controller 220 comprises a host interface 222 connected to the I/O port of the electronic instrument 200, a CPU 224, a memory control section 226 and a control logic section 228.

The ROM 240 has stored information for wireless communication protocol, information for KPS encryption/decryption, information for control of the entire system and information for MAC address.

The CPU 224 functions as means for previously exchanging the ID information between the electronic instrument 200 and other electronic instruments based on various information stored in the ROM 240 when the transmission/reception of data is to be performed. The CPU 224 also functions as means for encrypting and transmitting data and for decrypting encrypted data from the other electronic instruments after the ID information has been exchanged. Since the procedure used in the CPU 224 for generating the common cryptographic key and for encrypting/decrypting the data by using the common cryptographic key and secret algorithm is similar to that of FIGS. 5–7, further description thereof is omitted.

Figure 11:
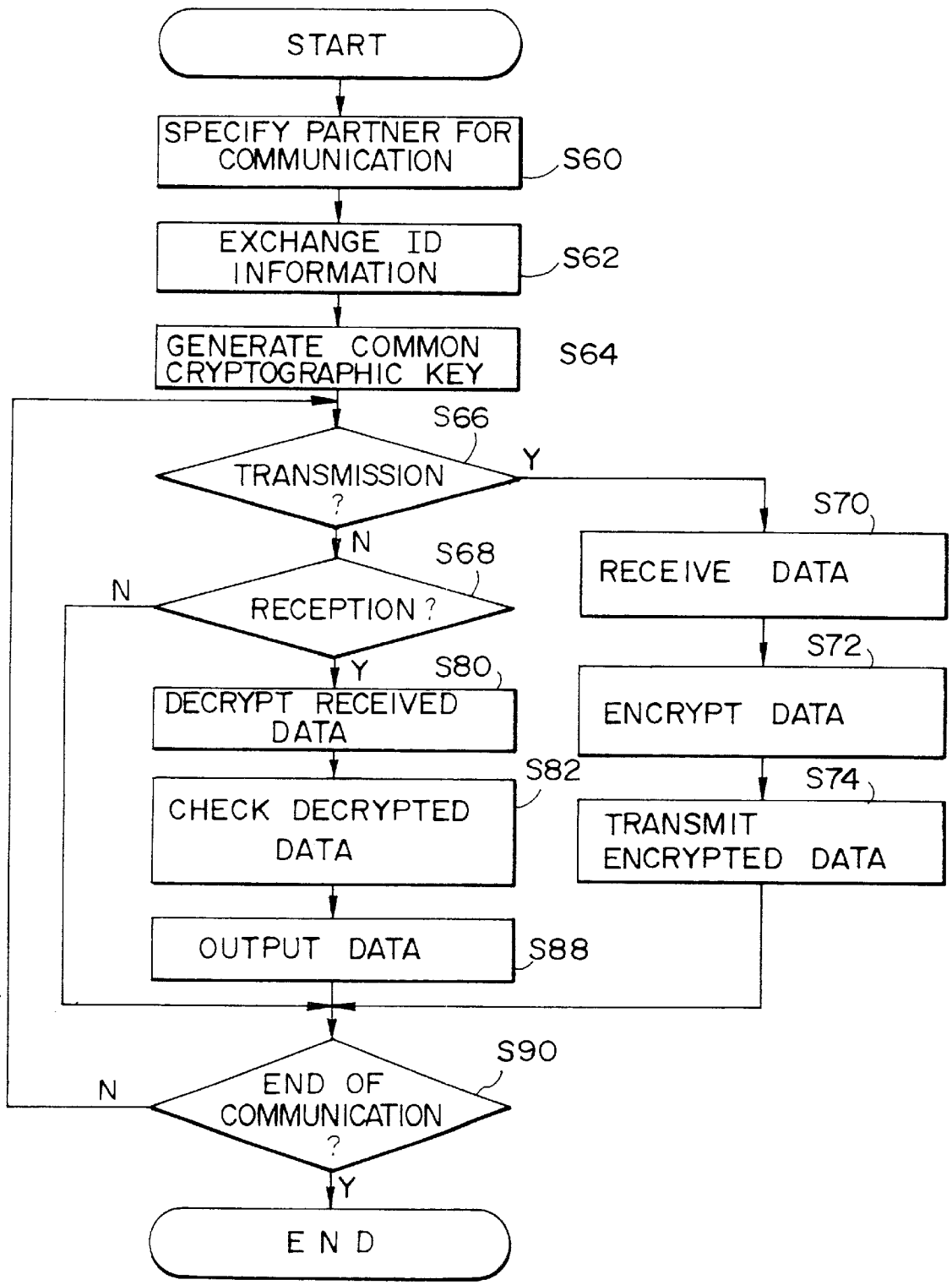
FIG. 11 is an operational flowchart of the hardware shown in FIG. 10.

FIG. 11 is an operational flowchart of the communication device 210 shown in FIG. 10.

It is now assumed herein that the communication device 210 has been connected to the electronic instrument 200 and is in its standby state in which the transmission/reception of data can be performed.

When a signal indicative of starting the communication to any particular electronic instrument is inputted from the host electronic instrument 200 to the wireless communication controller 220, or when the wireless communication controller 220 receives a communication request signal from other electronic instrument (step S60), the wireless communication controller 220 reads its own MAC address out of the ROM 240 as its ID information which is in turn transmitted to the specified electronic instrument through the transmission/reception section 212. Further, the wireless communication controller 220 receives a MAC address of the specified electronic instrument as its ID information, such a MAC address being temporarily stored in the RAM 250. In such a manner, the ID information will be exchanged between the electronic instruments (step S62). Thereafter, a common cryptographic key is generated by using the received ID information and its own secret algorithm (step S64). The encryption or decryption of the data is then performed.

More particularly, when the wireless communication controller 220 determines that the data from the host electronic instrument 200 should be transmitted toward the other electronic instrument (step S66), the wireless communication controller 220 receives the data from the host electronic instrument 200 (step S70). The data is then encrypted by using the common cryptographic key and its own secret algorithm (step S72). The encrypted data is wirelessly transmitted to the other electronic instrument through the transmission/reception section 212 (step S74).

When it is determined by the wireless communication controller 220 that encrypted data from the other electronic instrument should be decrypted (step S78), the wireless communication controller 220 decrypts the received data by using the common cryptographic key (step S80) and checks whether or not the decrypted data is altered on the way (step S82). Thereafter, the decrypted data is outputted toward the electronic instrument 200 (step S88).

The transmission/reception of encrypted data will be repeated until it is determined at step S90 that the communication has terminated.

Although the second embodiment has been described as to the communication device 210 which is removably mounted on the notebook-sized personal computer, the communication device 210 may be connectable to the connection terminal of various other electronic instruments such as a printer or a projector.

As described above, the electronic instrument having no KPS encryption/decryption function can be made to do the KPS encryption/decryption process by providing such as software as shown in FIG. 8 or by using such hardware as shown in FIG. 10.

3. Third Embodiment

The third embodiment of the present invention will be described in respect to a case when the KPS cryptographic communication is performed between one of a plurality of electronic instruments forming a wireless network and a third-party electronic instrument not belonging to the wireless network.

Figure 12:
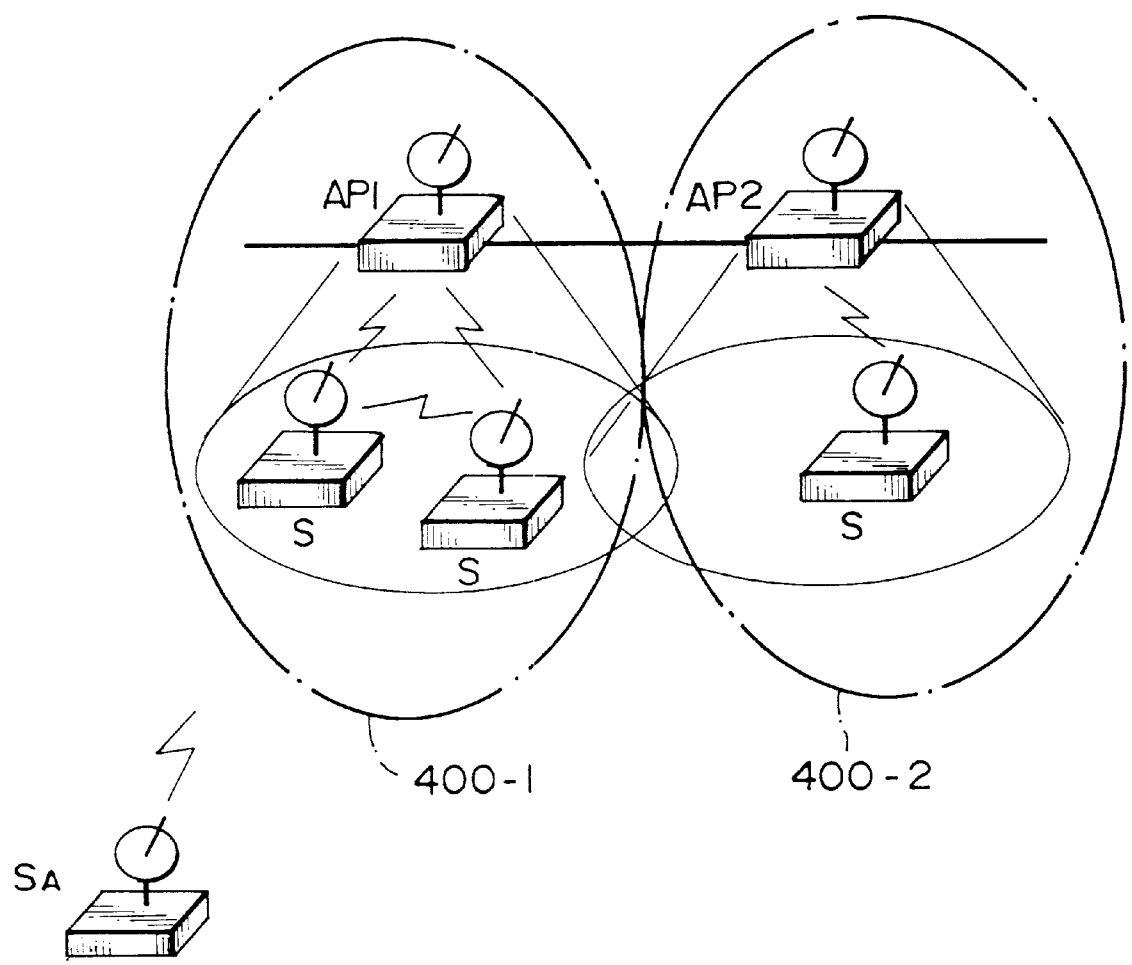
FIG. 12 illustrates the cryptographic communication between a station in a network and an external station not belonging to the network.

FIG. 12 shows a plurality of local area networks 400-1 and 400-2 which are wirelessly connected to each other. Each of the networks 400-1 and 400-2 comprises an electronic instrument functioning as an access point AP and a plurality of other electronic instrument functioning as stations S which are connected indirectly or directly to one another through the access point AP. Each of the stations S in the networks 400-1, 400-2 can make the communication with another station or electronic instrument directly or through the access point AP. In this case, access points and external station may be electronic instruments such as personal computers while the stations forming the networks may be electronic instruments such as personal computers or printers.

The access points AP1 and AP2 in the networks 400-1, 400-2 can perform the communication in a wire or wireless manner. Thus, a station belonging to one of the networks can communicate with another station belonging to the other network.

The communication between the stations belonging to both the networks 400-1 and 400-2 will thus be carried out such that the ID information of these stations is exchanged therebetween and the ID information is used together with the secret algorithms to perform the encryption/decryption of data and the transmission/reception of data, in the same manner as in the previously described first and second embodiments.

The third embodiment is characterized by that the wireless transmission/reception of encrypted data can be carried out between an electronic instrument not belonging to the networks 400 and any station S belonging to the networks 400.

Figure 13:
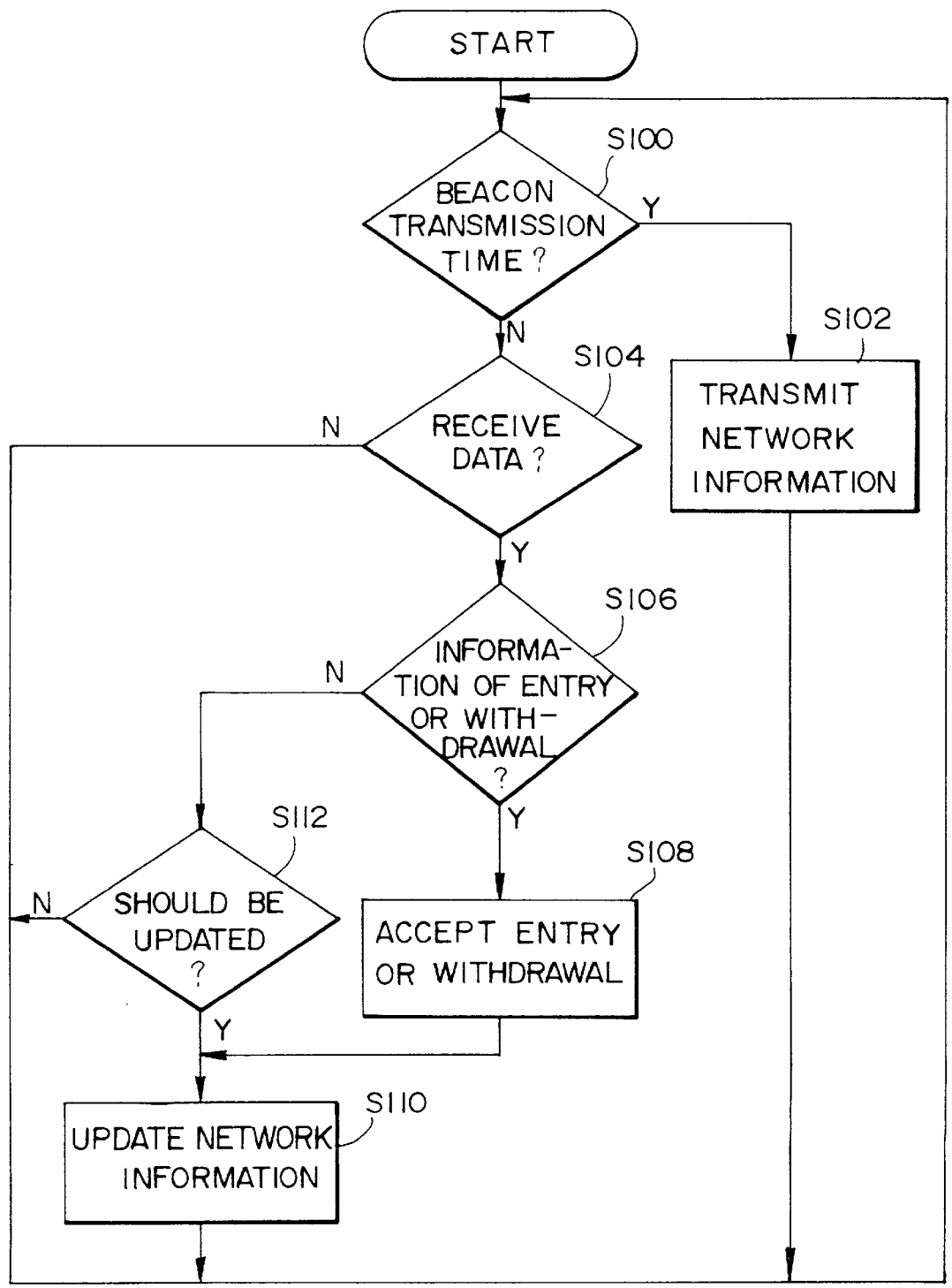
FIG. 13 is an operational flowchart of an electronic instrument functioning as an access point for the network shown in FIG. 12.

FIG. 13 shows a flowchart of an operation peculiar to a station which functions as an access point AP in the networks 400-1 or 400-2.

This access point AP generates network information containing ID information for the stations forming the networks 400 and if necessary ID information for the stations in any other network which is connected through the access point AP. At a given beacon transmission time which comes in periodic intervals, the network information will be wirelessly transmitted to the surrounding area (steps S100 and S102).

Thus, the respective stations S existing in the surrounding area around this access point AP can receive the network information to obtain the ID information (i.e., MAC address in this embodiment) for an electronic instrument with which communication is performed. In other words, the exchange of ID information between the stations can be completed by receiving the network information.

The network information thus received is stored at least until the next network information is received by the stations.

Each of the access points APs in the networks 400 determines whether or not there is a received data from any of the stations S forming the network or from the external station $S_A$ (step S104). If it is determined that there is such a received data, the access point AP determines whether or not the received data is entry or withdrawal offer information of the external station $S_A$ to that network (steps S106).

If it is determined that the received data is the entry or withdrawal offer information from the external station $S_A$, the access point AP accepts the entry or withdrawal offer and transmits an acceptance signal toward the external station $S_A$ (step S108). Thereafter, the information of the stations forming the network will be updated (steps S110).

More particularly, when the external station $S_A$ wants to enter the network, the network information is updated to contain information which indicates that the external station $S_A$ is one of the stations forming the network, ID information of the external station $S_A$ (i.e. MAC address in this embodiment), and other associated information. If the received data is the withdrawal offer information of the external station $S_A$, the network information will be updated to cancel the information relating to the external station $S_A$.

In such a manner, the external station $S_A$ can freely enter or withdraw from the networks 400.

If it is determined at step S106 that the received data is not the entry or withdrawal offer information relative to the network, it is further determined based on this received information whether or not the network information should be updated (step S112). If it is determined that the updating should be made, the network information will be updated (step S110). Such updating may be made when the ID information of the stations forming the networks has been changed, for example.

Figure 14:
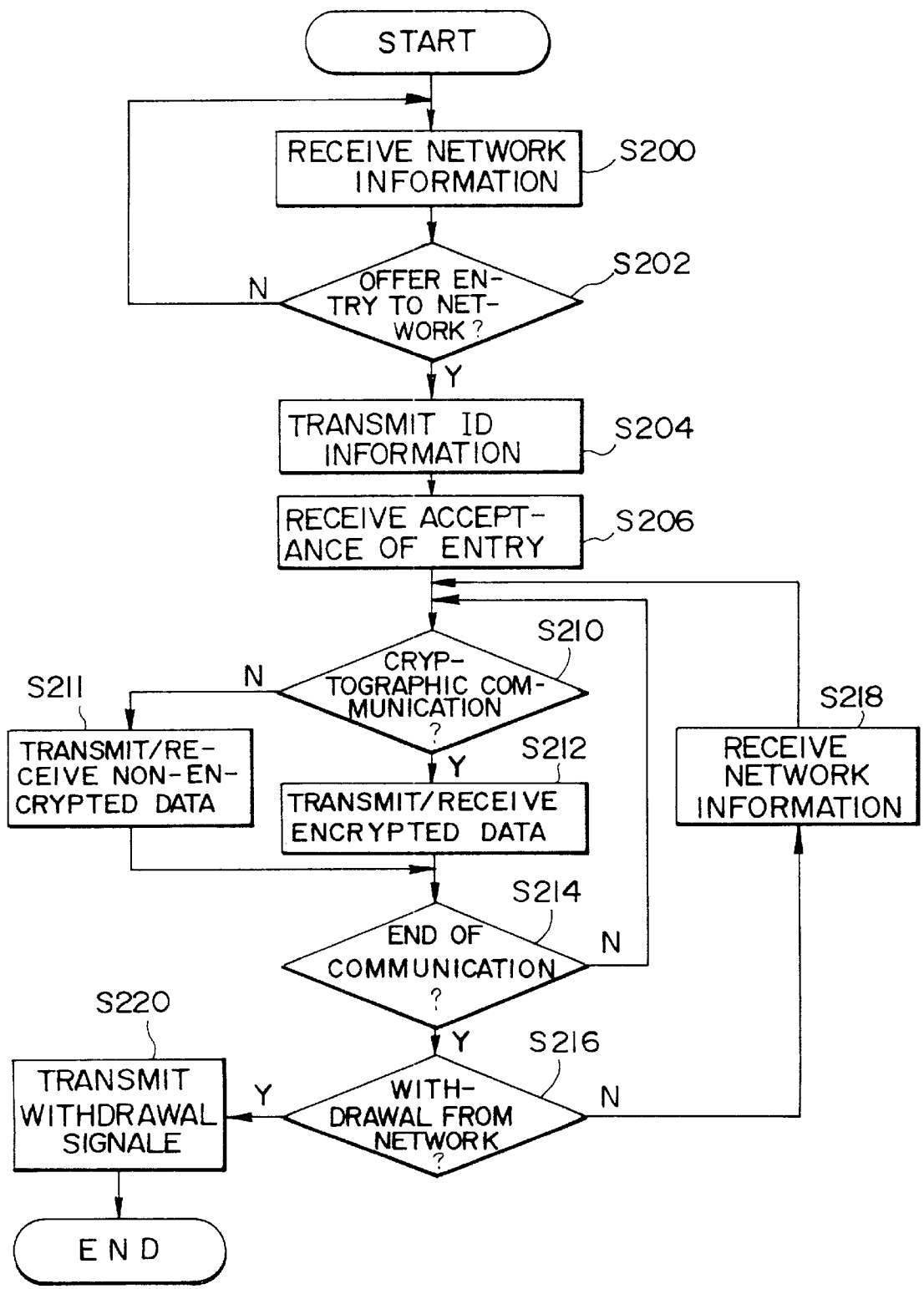
FIG. 14 is an operational flowchart of a station other than the access point.

FIG. 14 shows a flowchart illustrating operations of the electronic instruments S, $S_A$ which do not function as an access point AP. In FIG. 14, steps S200–S206 represent the operation peculiar to the external station $S_A$ not included in the networks 400 while steps S210–S220 represent the common operation to the stations S forming the networks and the external station $S_A$ newly added into the networks.

If the external station $S_A$ exists in a receiving area of the network information transmitted from the access point AP1, the external station $S_A$ can periodically receives the network information to obtain the ID information relating to the respective stations in the network 400-1 (step S200).

When the external station $S_A$ wants to make the cryptographic communication with a station in the network 400-1 or a station in the network 400-2 connected to the network 400-1 through the access point AP1, the external station $S_A$ may offer the entry to the network 400-1 (step The offer of entry to the network 400-1 is carried out by transmitting the ID information of the external station $S_A$ itself (i.e., MAC address in this embodiment), the entry offering data and so on toward the access point AP1 (step S204). The access point AP1 performs the determination shown in FIG. 13 (steps S104 and S106) and then accepts the entry of the external station $S_A$ to the network with an acceptance signal being then transmitted toward the external station $S_A$ (step S108).

When the external station $S_A$ receives this acceptance signal (step S206), it will enter the network 400-1.

Next, the access point AP of the network 400-1 updates the network information to represent the entry of the external station $S_A$ to the network 400-1 (step S110). The updated network information will be transmitted to the respective stations at predetermined time intervals (steps S100 and S102).

In this way, the stations in the network can mutually exchange the ID information by receiving the network information.

After the external station S, has entered the network 400-1, the stations belonging to the network 400-1 (including the external station $S_A$) can make cryptographic communication. When the external station $S_A$ which has entered the network or any station S originally belonging to the network 400-1 is to perform cryptographic communication (step S210), it specifies a station to perform the transmission/reception of encrypted data therebetween (step S212). If no cryptographic communication is to be performed, the transmission/reception of non-encrypted data will be carried out at step S211. Since the step S212 is similar to the procedure including steps S60, S64–S88 in the flowchart of FIG. 11, further description is omitted.

The transmission/reception of encrypted data between the stations may be carried out through the access point AP, but in this embodiment, this is carried out directly between the stations.

If it is determined that cryptographic communication has completed (step S214), it is further determined whether or not the station withdraws from the network (step S216). If it is determined that the station does not withdraw from the network, it receives the network information periodically transmitted and stands by for the next communication to any other station.

When the station is to withdraw from the network, a withdrawal signal is transmitted to the access point AP1 which in turn performs such determination as shown by S104 and S106 in FIG. 13. The access point AP1 then accepts the withdrawal of that station and updates the network information (steps S108 and S110).

For example, if the network information periodically transmitted from the access point AP1 in the network 400-1 includes the ID information of the stations in the other network 400-2 and yet if the network information periodically transmitted from the access point AP2 in the network 400-2 contains the ID information of the stations in the network 400-1, any external station entered either of the network 400-1 or 400-2 can similarly make cryptographic communication with any station belonging to the other network.

What is claimed is:

1. A wireless communication method for wirelessly transmitting and receiving data among a plurality of electronic instruments, each of said electronic instruments having identification information and a secret algorithm, said wireless communication method comprising:
   a first step of exchanging identification information between two electronic instruments in said plurality of electronic instruments, before data communication is performed between said two electronic instruments; and
   a second step of transmitting and receiving data between said two electronic instruments;
   wherein said second step includes:
   a conversion/transmission step in which one of said two electronic instruments converts data to be transmitted by using a secret algorithm of the one of said two electronic instruments and identification information of the other electronic instrument, and sends the converted data to the other electronic instrument; and
   a reception/reconversion step in which the other electronic instrument receives and reconverts the converted data by using a secret algorithm of the other electronic instrument and identification information of the one of said two electronic instruments.

2. The wireless communication method as defined in claim 1, wherein the converted data is encrypted data.

3. The wireless communication method as defined in claim 2,
   wherein, in said conversion/transmission step, the one of said two electronic instruments generates a cryptographic key by using a secret algorithm of the one of said two electronic instruments and identification information of the other electronic instrument to encrypt data by a cryptographic program which utilizes the cryptographic key; and
   wherein, in said reception/reconversion step, the other electronic instrument generates the same cryptographic key as the cryptographic key generated in the one of said two electronic instruments by using a secret algorithm of the other electronic instrument and identification information of the one of said two electronic instruments to decrypt said encrypted data by a cryptographic program which utilizes the cryptographic key.

4. The wireless communication method as defined in claim 3,
   wherein the one of said two electronic instruments is a computer which encrypts data for printing before transmission; and
   wherein the other electronic instrument is a printer which decrypts said encrypted data before printing.

5. The wireless communication method as defined in claim 3,
   wherein said two electronic instruments are computers which encrypt data, and transmit and receive the encrypted data.

6. The wireless communication method as defined in claim 3,
   wherein said encrypted data is wirelessly exchanged between an electronic instrument belonging to a first wireless network and another electronic instrument which does not belongs to said first wireless network.

7. The wireless communication method as defined in claim 6, wherein said first step includes:
   a network information transmission step in which network information including identification information of said electronic instrument which belongs to said first wireless network is wirelessly transmitted through an access point for said first wireless network repeatedly;
   an identification information obtaining step in which the other electronic instrument which does not belongs to said first wireless network receives said network information to obtain identification information of said electronic instrument which is a partner for wireless communication and belongs to said first wireless network; and an identification information provision step in which said electronic instrument which does not belongs to said first wireless network transmits its own identification information to said partner electronic instrument belonging to said first wireless network.

8. The wireless communication method as defined in claim 7, wherein said identification information provision step is carried out through an electronic instrument which functions as said access point.

9. The wireless communication method as defined in claim 7, wherein said second step is carried out directly between said two electronic instruments.

10. The wireless communication method as defined in claim 7,
   wherein said network information includes identification information of an electronic instrument which belongs to the other wireless network connected to said first wireless network through an access point;
   wherein, in said identification information obtaining step, said electronic instrument not belonging to said first wireless network obtains identification information of an electronic instrument of the other wireless network from said network information;
   wherein, in said identification information provision step, said electronic instrument not belonging to said first wireless network transmits its own identification information to the electronic instrument of the other wireless network; and
   wherein, in said second step, encrypted data is mutually transmitted and received by said two electronic instruments which has obtained mutual identification information.

11. The wireless communication method as defined in claim 1, wherein identification information is one of a medium access control (MAC) address and an internet protocol (IP) address.

12. A wireless communication apparatus provided in each of a plurality of electronic instruments for wirelessly transmitting and receiving data among said plurality of electronic instruments, said wireless communication apparatus comprising:
   communication means for performing wireless data transmission and reception with a communication apparatus of other electronic instrument;
   storage means for storing identification information and a secret algorithm of an electronic instrument to which said wireless communication apparatus belongs;
   conversion means for converting data by using identification information of the other electronic instrument and a secret algorithm of the electronic instrument to which said wireless communication apparatus belongs to transmit the converted data to the other electronic instrument through said communication means, and for reconverting another converted data transmitted from the other electronic instrument to said communication means into an original form by using identification information of the other electronic instrument and a secret algorithm of the electronic instrument to which said wireless communication apparatus belongs; and
   control means for sending identification information of the electronic instrument to which said wireless communication apparatus belongs toward the other electronic instrument and for receiving identification information of the other electronic instrument through said communication means before the transmission and reception of the converted data.

13. The wireless communication apparatus as defined in claim 12, wherein said conversion means comprises:
   encrypting means for encrypting data by using identification information of the other electronic instrument and a secret algorithm of the electronic instrument to which said wireless communication apparatus belongs; and
   decrypting means for decrypting encrypted data from the other electronic instrument by using identification information of the other electronic instrument and a secret algorithm of the electronic instrument to which said wireless communication apparatus belongs.

14. The wireless communication apparatus as defined in claim 13,
   wherein said encrypting means generates a cryptographic key from identification information of the other electronic instrument and a secret algorithm of the electronic instrument to which said wireless communication apparatus belongs, and encrypts data by a cryptographic program utilizing the cryptographic key; and
   wherein said decrypting means generates the same cryptographic key as the cryptographic key generated by said encrypting means from identification information of the other electronic instruments and a secret algorithm of the electronic instrument to which said wireless communication apparatus belongs, and decrypts encrypted data by a cryptographic program utilizing the cryptographic key.

15. The wireless communication apparatus as defined in claim 12, said wireless communication apparatus being included in an electronic instrument.

16. The wireless communication apparatus as defined in claim 12, said wireless communication apparatus being removably mounted in an electronic instrument.

17. The wireless communication apparatus as defined in claim 12, wherein the identification information is one of a medium access control (MAC) address and an internet protocol (IP) address.

18. A wireless communication system for wirelessly transmitting and receiving data among a plurality of electronic instruments, each of said electronic instruments having identification information and a secret algorithm,
   wherein each of said electronic instruments comprises:
      first means for mutually exchanging identification information with other electronic instrument which is a partner of wireless communication before performing data communication; and
      second means for performing transmission and reception of encrypted data with said partner electronic instrument with which identification information has been mutually exchanged; and
   wherein said second means includes:
      conversion/transmission means for generating a cryptographic key by using identification information of said partner electronics instrument and a secret algorithm of each of said electronic instruments to encrypt data by a cryptographic program utilizing the cryptographic key into encrypted data which is in turn transmitted to said partner electronic instrument; and
      reception/decryption means for generating the same cryptographic key as the cryptographic key generated by said conversion/transmission means by using identification information of said partner electronic instrument and a secret algorithm of each of said electronic instruments to decrypt encrypted data from said partner electronic instrument by a cryptographic program utilizing the cryptographic key.

19. The wireless communication system as defined in claim 18, wherein each of said electronic instruments is a computer which encrypts data for transmission and reception.

20. The wireless communication system as defined in claim 18, further comprising a first wireless network including a plurality of electronic instruments, and an electronic instrument not belonging to said first wireless network;

wherein said first wireless network includes an access point for repeatedly transmitting network information which includes identification information of electronic instruments belonging to said first wireless network;

wherein said electronic instrument not belonging to said first wireless network includes means for obtaining identification information of an electronic instrument which is a partner of wireless communication and for transmitting its own identification information to this partner electronic instrument; and wherein said partner electronic instrument includes means for receiving identification information of said electronic instrument not belonging to said first wireless network.

21. The wireless communication system as defined in claim 18, wherein identification information is one of a medium access control (MAC) address and an internet protocol (IP) address.

22. An information storage medium provide din an electronic instrument which wirelessly transmits and receives encrypted data relating to other electronic instrument, storing:

first information including identification information and a secret algorithm of the electronic instrument to which said information storage medium is included;

second information for exchanging mutually identification information with the other electronic instrument before wireless communication; and third information for carrying out transmission and reception of encrypted data between the electronic instrument to which said information storage medium is included and the other electronic instrument;

wherein said third information includes:

information for generating a cryptographic key from identification information of the other electronic instrument and a secret algorithm of the electronic instrument to which said information storage medium is included, and for encrypting data by a cryptographic program utilizing the cryptographic key to transmit encrypted data to the other electronic instrument; and information for generating the same cryptographic key from identification information of the other electronic instrument and a secret algorithm of the electronic instrument to which said information storage medium is included, and for decrypting encrypted data from the other electronic instrument by a cryptographic program utilizing the cryptographic key.

23. The information storage medium as defined in claim 22, wherein identification information is one of a medium access control (MAC) address and an internet protocol (IP) address.

* * * * *